April 4, 1961 W. C. HIGBY 2,977,694
SNOW BLOWER
Filed Aug. 12, 1957 2 Sheets-Sheet 1
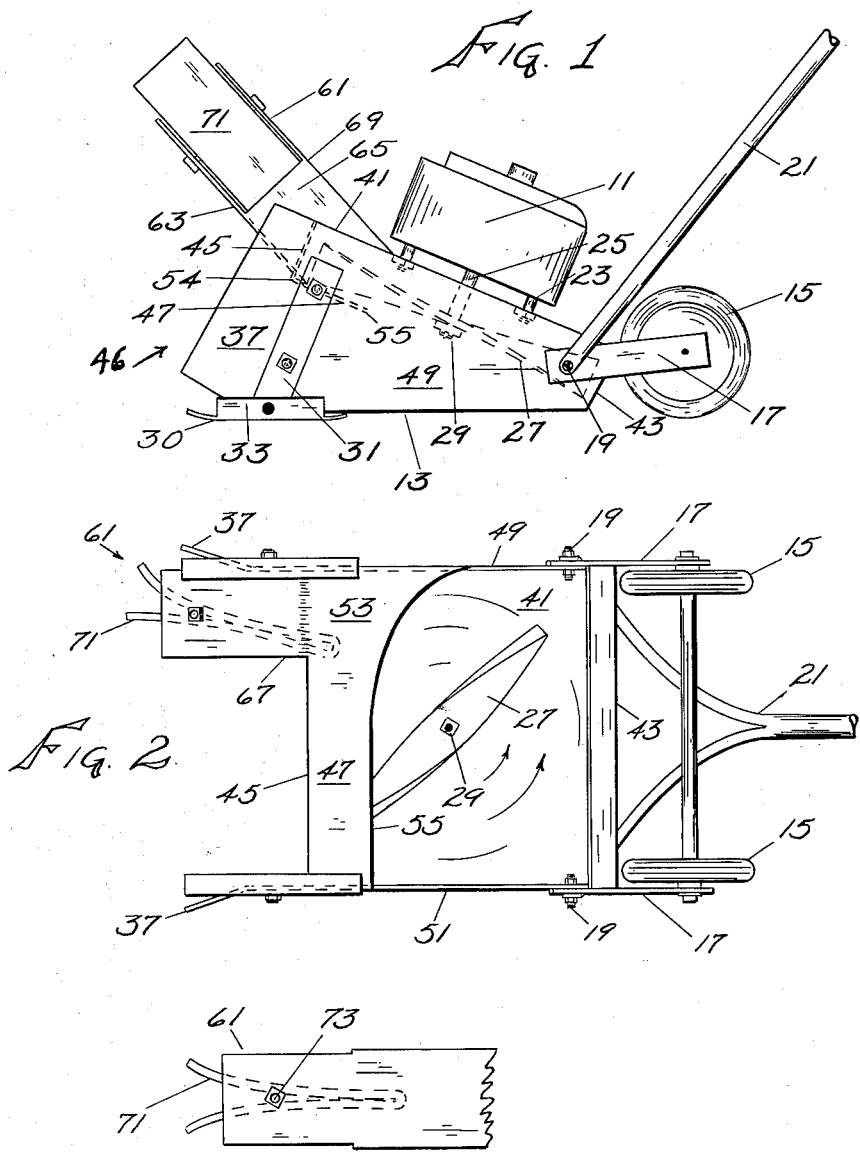
INVENTOR.
WILLARD C. HIGBY
BY
Robert C. Wright April 4, 1961 W. C. HIGBY 2,977,694
SNOW BLOWER
Filed Aug. 12, 1957 2 Sheets-Sheet 2
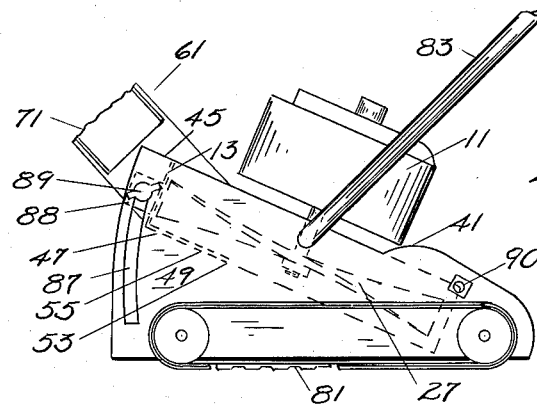
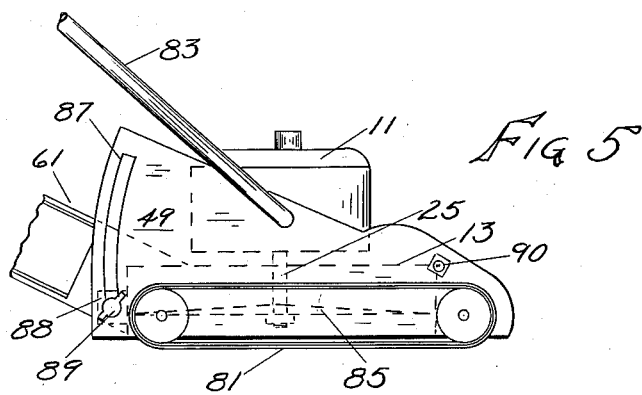
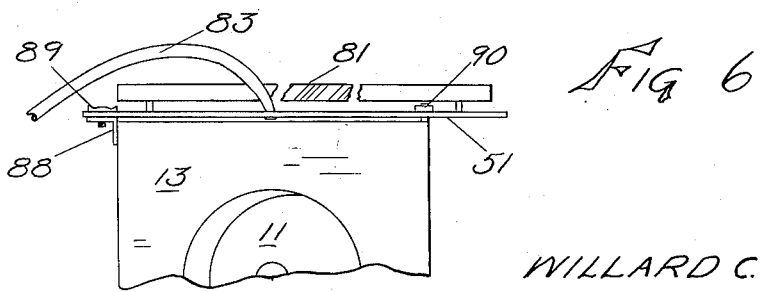
INVENTOR.
WILLARD C. HIGBY
BY
Robert O. Wright

United States Patent Office 2,977,694
Patented Apr. 4, 1961

2,977,694
SNOW BLOWER
Willard C. Higby, Lowville, N.Y.
Filed Aug. 12, 1957, Ser. No. 677,448
1 Claim. (Cl. 37—43)

This invention relates to a rotating blade device which is adapted for removing snow or cutting grass and more particularly concerns a snow blower which has a rotary snow paddle and a device which can be readily converted from a snow blower into a lawn mower.

With prior home snow blowers which are on the market and are of the screw type, difficulties were experienced in removing deep snow. It is not believed that a rotary blade snow blower which would be less expensive has found acceptance with home owners, although there have been proposals in patents. Furthermore, there is no commercially available device which can be converted from a snow blower to a lawn cutter or vice versa, especially such a device that is relatively inexpensive.

The primary object of the present invention is to provide an inexpensive and improved snow blower for home use. Another object is to provide an improved snow blower which is readily convertible into a rotary lawn mower. An additional object is the provision of combination snow and grass-cutting blower which has means for discharging to either side. A further object is the provision of an improved convertible snow blower which includes endless tracks. Another object is the provision of an improved combination snow and grass-cutting blower which has one fillet corner in the bottom and a rear edge which is close to the ground or sidewalk level. These and other objects and advantages of the invention will more fully appear from the following description made in connection with the accompanying drawings wherein like reference characters refer to similar parts throughout the several views and in which:

Figure 1 is a left side elevation of the snow blower with certain of the internal parts indicated;

Figure 2 is a bottom plan view of the snow blower with a portion in dotted lines;

Figure 3 is an enlarged top view of the chute and deflector portion shown in Figure 1;

Figure 4 is a side elevation of the convertible snow plow-lawn mower arranged as a snow plow with certain of the internal parts in dotted lines;

Figure 5 is a side elevation of the convertible device employed as a lawn mower with certain of the parts in dotted lines; and Figure 6 is a top plan view of Figure 5.

Referring to Figures 1 and 2 of the drawings, it can be seen that a motor 11 is mounted on the inclined top wall of an open-bottom, box-like structure or wall means 13. The motor 11 can be a conventional four-cycle or two-cycle internal combustion engine, an electric motor or other suitable power means. Two wheels 15 support the rear part of the box means 13 and are mounted by generally horizontally extending brackets 17 which are connected to each rear side of the box means 13 by fasteners 19. A forked handle 21 (having its hand clasp part omitted) is also attached to the box 13 exteriorly of the bracket 17 by means of fasteners 19 and extends rearwardly above the wheels 15 for manually guiding and pushing the blower.

The motor 11 is fastened to the top wall of the box 13 by four equi-spaced fasteners 23. The motor shaft 25 extends into the interior of the box and has a snow paddle 27 (which is formed by bending the outer thirds of a flat plate approximately 90° relative to the mid portion) removably mounted thereon by a nut 29, threaded and locked on the end of the motor shaft 25. It is to be noted that snow paddle 27 is positioned at approximately a 30° angle to the ground. At the front of the box 13, runners 30 are pivoted to the bottom end of brackets 31. Runners 30 have slightly curved front and rear ends and upwardly extending flanges 33 which are outwardly of the brackets 31. Brackets 31 are mounted on side guides 37 which are formed by the outwardly inclined front extensions of the side walls of the box 13.

The box-like wall means 13 is formed by a square top wall 41 through which the motor shaft 25 passes. A rectangular rear wall 43, a rectangular front wall 45 which has an inwardly extending flange 47 and the identical generally triangular shaped side walls 49, 51 are connected to the top wall 41 so that an open bottom box is formed and provides a snow pick-up opening at the bottom of the paddle. It is to be noted that walls 43, 45 and 41 form an inverted U-shaped wall member. The flange 47 has a fillet extension or portion 53 at the left front side. It is to be noted that the bottom edge of wall 45 or the outer end 54 of the flange 47 and the adjacent vertically-extending parts of the side walls 49, 51 form a rectangular front snow entrance 46 for admitting snow which will be guided thereto by the outwardly-inclined forward extensions 37 of the side walls 49, 51. The inner end 55 of the flange 47 terminates at a transverse line which is about one-quarter of the diameter of the snow paddle from edge 54.

A chute 61 is formed at the left front side of the box 13 by a bottom wall 63 extending at about a 75 degree angle from the front wall 45, two shorter side walls 65, 67 and a top wall 69. In order to provide an outlet to the chute 61 corresponding openings are formed in the front and top walls of the box. These openings can be referred to as an outlet in the top left front corner of the U-shaped wall member.

A deflector 71 is pivotally mounted on pin 73 extending between the top and bottom walls of the chute 61. Deflector 71 extends exteriorly of the chute. It is to be noted that the shoes or runners 30 and wheels 15 which can be referred to as vehicle means will position the bottom edge of the rear wall a short distance (about one-half inch) from the ground or sidewalk.

The operation of the snow thrower shown in Figures 1–3 is believed apparent from the foregoing. The lower point of the extensions 37 will funnel in snow to clear a path for the runners and wheels. The snow will be picked up by the high speed paddle 27 (which is rotated counterclockwise as seen from the bottom) and propelled as fine particles out of the chute 61 to the right or left depending on the position of the deflector 71. It is to be noted that the blade attacks the snow at an angle whereby improved operation results and that the rear edge will scrape up snow to within very close of the ground or sidewalk.

Referring now to the modification shown in Figures 4 and 5, it can be seen that this device is very similar to the device of Figures 1–3 except that it has tracks or vehicle means 81, a reversible handle 83, and means for obtaining vertical adjustment of the front end of the box-like structure 13. The parts and elements which are common to both devices have been given the same reference numerals. The differences will now be described in detail. Motor 11 drives a snow paddle 27 as seen in Figure 4, while it drives a conventional grass and weed cutting blade 85 as seen in Figure 5. (See Patent No. 2,719,396.) The side walls 49, 51 differ in that they do not have guides such as guides 37 in Figures 1–3 although they could be provided if desired. The U-shaped member is pivotally attached at a top rear edge to the side walls 49, 51 at 90. The side walls 49, 51 have arcuate grooves or slots 87. L-shaped brackets 88 are connected to the front corners of the box. Wing nuts 89 thread into brackets 88 and provide for adjusting the device for various levels from a high snow blower position to a low lawn cutting position. In the Figures 4–6 device, the side walls 49, 51 are not rigidly attached to the top wall or the back and front walls. Otherwise the arrangement is essentially the same as previously described in connection with Figures 1–3.

The operation of the device of Figures 4–6 is believed apparent from the foregoing. Thus, when it is desired to remove snow, the box is adjusted to the upper heights and locked in position by means of wing nuts 89. Snow is picked up and discharged as above described. When it is desired to cut grass, the blade 85 replaces paddle 27 and the device is pushed in the direction indicated in Figure 5. It is to be noted that handle 83 is connected at the location of motor shaft 25 for this switch operation. Lawn cutting will be accomplished in the conventional manner. It is to be noted that the vehicle means provide ground-contact parts (wheels and runners or tracks) in a common plane and that the paddle and top wall are inclined toward the front and upwardly about thirty degrees in relation to this common plane or the horizontal plane.

It is understood that changes can be made in disclosed embodiments by persons skilled in the art without departing from the invention as defined by the following claims.

What is claimed is:

A snow blower comprised of a high-speed rotary snow paddle; wall means operatively encasing said paddle; said wall means including an inverted U-shaped wall member providing a square top wall, a front wall and a back wall for said paddle; said wall means including two side walls of general triangular shape each having a horizontally-extending bottom edge and each decreasing in height from its front edge to its back edge; said U-shaped member extending between said side walls; said paddle being mounted on a shaft arranged perpendicular to said top wall and extending therethrough; motor means mounted on said top wall and operatively connected to said shaft, said U-shaped member being connected to the top edge part of said side walls so that said top wall and said paddle are inclined upwardly toward the front and at an angle of approximately thirty degrees in relation to the horizontally-extending bottom edges of said side walls; ground support means positioned at the forward and at the rearward portions of said wall means supporting said wall means so that the bottom edges of said side walls and said back wall are adjacent ground level; said front wall having an inwardly-extending flange which extends about one-fourth the diameter of said paddle; chute means connected to a side corner of said front wall; said chute means being inclined upwardly in relation to said top wall and having an adjustable deflector arranged to direct snow to either side of the blower path.

References Cited in the file of this patent

UNITED STATES PATENTS

| | | |
|---|---|---|
| 1,531,742 | Fahrney | Mar. 31, 1925 |
| 1,577,561 | Chiles | Mar. 23, 1926 |
| 1,789,753 | Hulslander | Jan. 20, 1931 |
| 2,071,872 | Cockburn | Feb. 23, 1937 |
| 2,675,660 | Barnard | Apr. 20, 1954 |
| 2,675,661 | Titzer | Apr. 20, 1954 |
| 2,713,917 | Soenksen | July 26, 1955 |
| 2,732,638 | Leufvenius | Jan. 31, 1956 |
| 2,743,538 | Linzy | May 1, 1956 |
| 2,763,116 | Flinchbaugh et al. | Sept. 18, 1956 |
| 2,855,060 | Colburn | Oct. 7, 1958 |
| 2,889,641 | Rechenberg | June 9, 1959 |

FOREIGN PATENTS

| | | |
|---|---|---|
| 91,796 | Switzerland | Nov. 16, 1921 |
| 633,207 | Great Britain | Dec. 12, 1949 |
| 637,832 | Great Britain | May 24, 1950 |